United States Patent [19]

O'Donnell

[11] 4,147,687

[45] Apr. 3, 1979

[54] FORMED OBJECTS OF COAL FLYASH AND METHODS OF MAKING THE SAME

[76] Inventor: Hugh T. O'Donnell, 929 Corporation St., Beaver, Pa. 15009

[21] Appl. No.: 809,475

[22] Filed: Jun. 23, 1977

Related U.S. Application Data

[63] Continuation of Ser. No. 576,388, May 12, 1975, abandoned, which is a continuation-in-part of Ser. No. 360,185, May 14, 1973, abandoned.

[51] Int. Cl.² .................. C08J 3/20; C08K 3/02; C08K 5/01
[52] U.S. Cl. ............... 260/33.6 R; 260/33.6 AQ; 260/33.6 PQ; 260/33.6 UA; 260/37 R; 260/37 EP; 260/38; 260/39 SB; 260/40 R; 260/42; 260/42.28; 260/42.37; 260/42.43; 260/42.46; 260/42.47; 260/42.48; 260/42.49; 260/42.52; 264/211; 264/331; 106/DIG. 1
[58] Field of Search .............. 260/33.6 R, 37, 38, 260/40 R, 42, 42.37, 42.43, 42.46, 42.47, 42.49, 42.52, 33.6 PQ, 33.6 UA, 33.6 AQ; 264/211, 331

[56] References Cited

U.S. PATENT DOCUMENTS

| 3,665,068 | 5/1972 | Duling et al. | 264/211 |
|---|---|---|---|
| 3,836,504 | 9/1974 | Morisawa | 260/42 |
| 3,846,366 | 11/1974 | Wallace | 260/38 |
| 3,991,005 | 11/1976 | Wallace | 106/DIG. 1 |

FOREIGN PATENT DOCUMENTS 849033 9/1960 United Kingdom ................ 264/211

*Primary Examiner*—Allan Lieberman
*Attorney, Agent, or Firm*—Buell, Blenko & Ziesenheim

[57] ABSTRACT

A new decorative and structural product and method of making the same is provided wherein coal flyash as a major component is mixed with a thermosetting or thermoplastic resin and formed under heat and pressure into a desired shape.

7 Claims, No Drawings

FORMED OBJECTS OF COAL FLYASH AND METHODS OF MAKING THE SAME

This application is a continuation of copending application Ser. No. 576,388, filed May 12, 1975, now abandoned which in turn was a continuation-in-part of Ser. No. 360,185, filed May 14, 1973, now abandoned.

This invention relates to formed objects of coal flyash and methods of making the same using thermoplastic and thermoset resins as binders.

The accumulation of coal flyash has been a real problem in the field of solid pollution and unsightly accumulations of such solid wastes in various parts of the country have been both ecologically and esthetically undesirable. There have been many proposals for use of this material but to date nothing has been proposed which provided an acceptable solution to its disposal.

I have invented a product and method utilizing this waste material which permits it to be formed into high quality moldings which may be used to replace many of the ceramic, structural and masonry moldings presently in use. In my invention I provide a molded product consisting essentially of coal flyash in a matrix of thermoplastic and thermoset resins. In my practice I mix coal flyash with a much smaller amount, about 5% to 25% by weight of a thermosetting or thermoplastic resin and form the desired product under heat and pressure. A small amount of mineral oil, preferably less than 1% by weight is added to the mixture prior to processing to aid in mixing and extrusion.

Among the thermoplastic and thermosetting resins which I may use are homopolymers and copolymers of vinyl aromatic compounds, polystyrene, acrylonitrite-butadiene, styrene copolymers, styrene-butadiene copolymers, polyamide, polymers prepared from monoolefins, polyethylene, polypropylene, vinyl polymers, polyvinyl chloride, polyvinyl acetate, polyvinyl-idene chloride, phenolics, alkyds, epoxies, polyesters and cross linkable polyethylene.

The coal flyash is mixed with the resins in amounts within the stated limits to produce the desired density and physical properties in the end product being produced.

The products and method of this invention can be produced using a screw type extruder and/or a two roll mill, ram screw or plunger injection molding machine or any of the other well known equipment for heating and pressure forming.

The process temperature used in my invention will vary between about 225° F. and 510° F. depending upon the resin being used.

The invention can perhaps best be illustrated by reference to the following examples illustrating my invention.

EXAMPLE I

Using the subject invention a product was formed using 90 percent Bituminous coal flyash and 10 percent polystyrene plastic. A small quantity of mineral oil (equivalent to 1/10 percent by weight of total mix) was added to the mixture to assure thorough mixing and facilitate extrusion. The mixture was heated to approximately 350° F. and extruded through a ½ inch diameter die on a 1 inch N.R.M. extruder. The resultant product cooled in less than two minutes to a rigid consistency. The new material had a specific gravity of 1.703 (106.3 lbs./ft.³) and a compressive breaking strength of 8,390 pounds per square inch. The product is extremely resistant to breakage by impact and exhibits a generally 'tough' physical characteristic. The material can be sawed using silicone carbide or diamond cutting equipment as the hardness of the product approaches 7 on moh's scale. The material can more easily be cut with a hot wire.

EXAMPLE II

Using the subject invention method, a product was formed using 75 percent Bituminous coal flyash and 25 percent polystyrene plastic. A small quantity of mineral oil was added to the mixture to assure thorough mixing and facilitate extrusion. The mixture was heated to approximately 350° F. in a 1 inch N.R.M. extruder and extruded through a ½ inch diameter die. The resultant extruded product cooled in less than two minutes to a rigid consistency. The new product has a specific gravity of 1.535 (95.79 pounds per cubic/ft.) and a compressive breaking strength of 10,233 p.s.i.

The flyash used in these tests is "typical" of most bituminous coal flyash. It contains 95.9 percent ash, 0.3 percent moisture, 3.0 percent fixed carbon and was collected from a boiler stack by an electrostatic precipitator.

EXAMPLE III

Flyash recovered from the stack of a pulverized coal burning power generator boiler was mixed with 25% by weight of styrene-butadiene copolymers and formed into large hollow pots for plants in a heated mold under pressure. The resulting product had good strength and handling ability.

The method and product of this invention are particularly interesting since it uses flyash which has been heretofore an undesirable and generally unusable environmental pollutant.

In the foregoing specification I have set out certain preferred embodiments and practices of my invention, however, it will be understood that this invention may be otherwise embodied within the scope of the following claims.

I claim:
1. A new rigid, formed decorative and structural product consisting of about 75% to 95% coal flyash and the balance a matrix of plastic resin from the group consisting of thermoplastic and thermosetting resins and an effective amount of 0.1% up to 1% of mineral oil to aid mixing of the coal flyash and the plastic resin.
2. A product as claimed in claim 1 wherein the plastic resin is a thermoplastic resin.
3. A product as claimed in claim 1 wherein the plastic resin is a thermosetting resin.
4. A product as claimed in claim 1 formed by hot extrusion.
5. A method of forming decorative and structural products comprising the steps of
   (a) admixing a two component system consisting of about 75% to 95% coal flyash with about 5% to 25% by weight of a plastic resin from the group consisting of thermoplastic and thermosetting resins and an effective amount of 0.1% up to about 1% of mineral oil to aid mixing of the coal flyash and the plastic resin.
   (b) heating the mixture to a temperature sufficient to provide the desired plasticity, and
   (c) forming the desired product under pressure.

* * * * *

UNITED STATES PATENT AND TRADEMARK OFFICE
CERTIFICATE OF CORRECTION

PATENT NO. : 4,147,687
DATED : April 3, 1979
INVENTOR(S) : HUGH T. O'DONNELL

It is certified that error appears in the above-identified patent and that said Letters Patent are hereby corrected as shown below:

The following claims have been omitted from the above-identified original patent and should be included to read as follows:

Claim 6: A method as claimed in Claim 5 wherein the resin is a thermoplastic resin.

Claim 7: A method as claimed in Claim 5 wherein the resin is a thermosetting resin.

Signed and Sealed this

Twenty-sixth Day of June 1979

[SEAL]

Attest:

RUTH C. MASON
Attesting Officer

DONALD W. BANNER
Commissioner of Patents and Trademarks